United States Patent
Naka

(10) Patent No.: US 12,100,798 B2
(45) Date of Patent: Sep. 24, 2024

(54) CONSTRAINT JIG AND MANUFACTURING METHOD OF BATTERY

(71) Applicant: KABUSHIKI KAISHA TOSHIBA, Tokyo (JP)

(72) Inventor: Tomomichi Naka, Chigasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 169 days.

(21) Appl. No.: 17/400,533

(22) Filed: Aug. 12, 2021

(65) Prior Publication Data
US 2021/0376370 A1 Dec. 2, 2021

Related U.S. Application Data

(63) Continuation of application No. PCT/JP2019/010043, filed on Mar. 12, 2019.

(51) Int. Cl.
*H01M 10/04* (2006.01)
*H01M 10/6556* (2014.01)
(Continued)

(52) U.S. Cl.
CPC ..... *H01M 10/049* (2013.01); *H01M 10/6556* (2015.04); *H01M 50/308* (2021.01); *H01M 50/342* (2021.01); *H01M 50/40* (2021.01)

(58) Field of Classification Search
CPC ........... H01M 10/049; H01M 10/6556; H01M 50/308; H01M 50/342; H01M 50/40; H01M 10/0566; H01M 10/0404; H01M 10/0481; H01M 10/052; H01M 50/609; H01M 10/058; Y02E 60/10; Y02P 70/50
See application file for complete search history.

(56) References Cited

U.S. PATENT DOCUMENTS 10,018,681 B2   7/2018   Tsuruta
10,797,276 B2   10/2020  Moomaw et al.
(Continued)

FOREIGN PATENT DOCUMENTS

CN   102473981 A   5/2012
CN   104466300 A   3/2015
(Continued)

OTHER PUBLICATIONS

International Search Report issued Apr. 23, 2019 in PCT/JP2019/010043, filed on Mar. 12, 2019, 1 page.

*Primary Examiner* — Lisa S Park
(74) *Attorney, Agent, or Firm* — Oblon, McClelland, Maier & Neustadt, L.L.P.

(57) ABSTRACT

According to one embodiment, a constraint jig, used in manufacturing of a battery in which an electrode group is stored in an exterior container having a square shape, is provided. The constraint jig includes a plurality of metal constraint plates. The plurality of constraint plates are arrayed, and form a space in which the battery is arranged between constraint plates adjacent to each other. The plurality of constraint plates constrain the battery arranged in the space, and thus prevent an expansion of the exterior container beyond a predetermined range. Each of the constraint plates has an inner hollow, and includes an inflow port allowing a cooling fluid to flow into the inner hollow and an outflow port allowing the cooling fluid to flow out of the inner hollow.

5 Claims, 7 Drawing Sheets

(51) Int. Cl.
    *H01M 50/308*     (2021.01)
    *H01M 50/342*     (2021.01)
    *H01M 50/40*     (2021.01)

(56) References Cited

U.S. PATENT DOCUMENTS

| | | | |
|---|---|---|---|
| 2006/0200972 A1* | 9/2006 | Onishi | H01M 50/296 |
| | | | 320/107 |
| 2014/0057145 A1 | 2/2014 | Goldstein et al. | |
| 2014/0356659 A1 | 12/2014 | Kado | |
| 2019/0011502 A1* | 1/2019 | Kobayashi | H01M 10/486 |

FOREIGN PATENT DOCUMENTS

| | | | |
|---|---|---|---|
| CN | 209880762 | * | 2/2019 |
| JP | 2002-310585 A | | 10/2002 |
| JP | 2004-355977 A | | 12/2004 |
| JP | 2010040345 | * | 2/2010 |
| JP | 2013-125650 A | | 6/2013 |
| JP | 2014-232665 A | | 12/2014 |
| JP | 2015-122191 A | | 7/2015 |
| JP | 2015-170490 A | | 9/2015 |
| JP | 2016-197588 A | | 11/2016 |
| JP | 2017-508241 A | | 3/2017 |
| JP | 2018092724 | * | 6/2018 |

\* cited by examiner

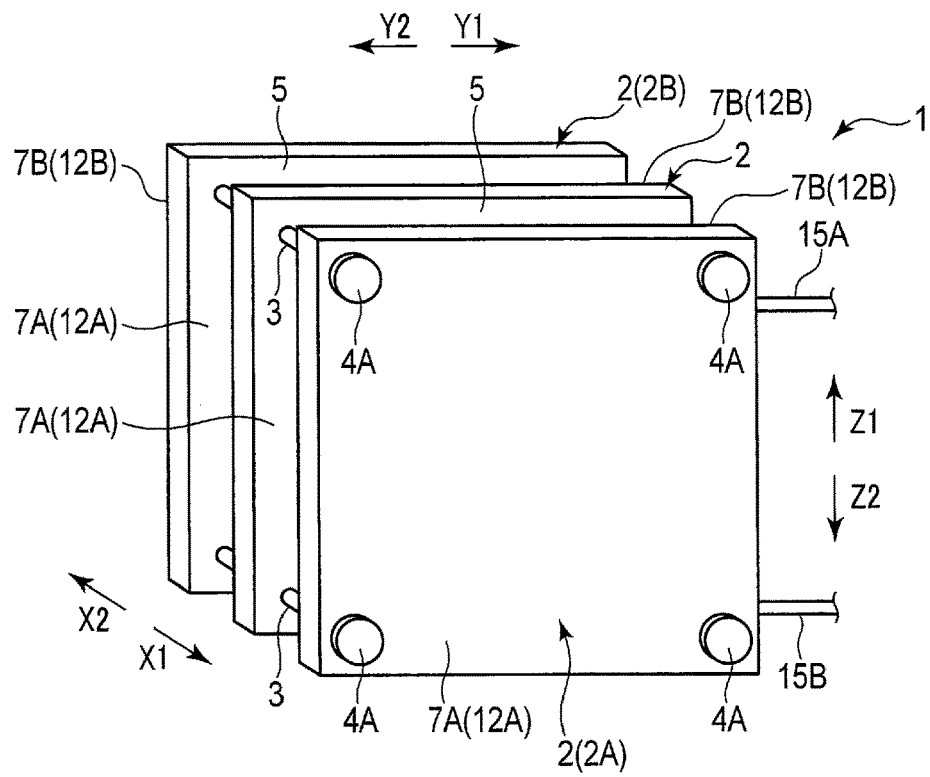
F I G. 1
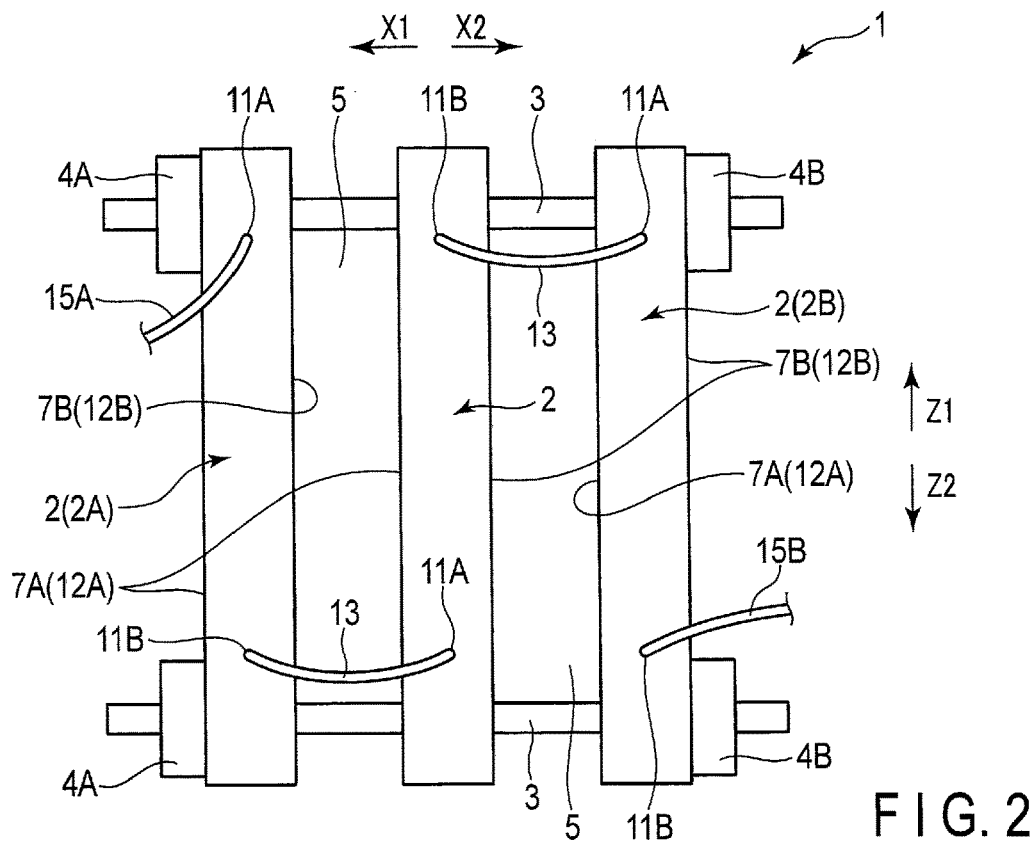
F I G. 2

CONSTRAINT JIG AND MANUFACTURING METHOD OF BATTERY

CROSS-REFERENCE TO RELATED APPLICATIONS

This is a Continuation Application of PCT Application No. PCT/JP2019/010043, filed Mar. 12, 2019, the entire contents of which are incorporated herein by reference.

FIELD

Embodiments described herein relate generally to a constraint jig and a manufacturing method of a battery.

BACKGROUND

A nonaqueous electrolyte battery such as a lithium ion battery is used as a battery. In manufacturing of such a battery (secondary battery), an electrode group including a positive electrode and a negative electrode is stored in an exterior container formed into a square shape (rectangular parallelepiped shape), for example. Furthermore, an electrolytic solution is injected into the exterior container through its liquid injection port. With the electrode group and the electrolytic solution being stored in the exterior container, the liquid injection port is sealed (temporarily sealed) with a plug, etc., thereby forming a temporarily sealed battery (temporary battery). Then, the battery is at least charged in such a manner that its state of charge is adjusted to fall within a predetermined range. In this manner, the battery enters a charged state. Then, the battery (temporary battery) is held in a high temperature atmosphere. Because of battery charging (initial charging) and aging in a high temperature atmosphere, gas is generated inside the exterior container by, for example, electrolysis of water adhering to the electrode group. As a result, impurities such as water and carbon dioxide adhering to the electrode group, etc., are released as gas from the electrode group, etc. After aging in the high temperature atmosphere, the battery is held in a normal temperature atmosphere such as room temperature. Then, when the temperature of the battery (the electrode group and the exterior container) drops to around room temperature due to aging at normal temperature, an opening is formed in the exterior container by, e.g., detaching the plug attached to the liquid injection port. In this manner, gas generated through aging, etc., is released from the inside of the exterior container to the outside of the exterior container through the opening (for example, the liquid injection port). After gas is released, the opening is sealed (definitively sealed) by, for example, welding a sealing plate to the exterior container at the opening (for example, the liquid injection port).

Manufacturing of a battery in the above manner requires the electrolytic solution to be suppressed from flowing out though the opening (for example, the liquid injection port) when gas is released to the outside after charging and aging. By the electrolytic solution flowing out through the opening, the electrolytic solution adheres to the vicinity of the opening on the outer surface of the exterior container. Adhesion of the electrolytic solution to the vicinity of the opening may affect welding of the sealing plate to the exterior container, which may affect sealing (definitive sealing) of the opening.

BRIEF DESCRIPTION OF THE DRAWINGS

FIG. 1 is a perspective view schematically showing a constraint jig according to a first embodiment.

FIG. 2 is a schematic view showing the constraint jig according to the first embodiment in a state of being viewed from one side in a first direction

DETAILED DESCRIPTION

Figure 3:
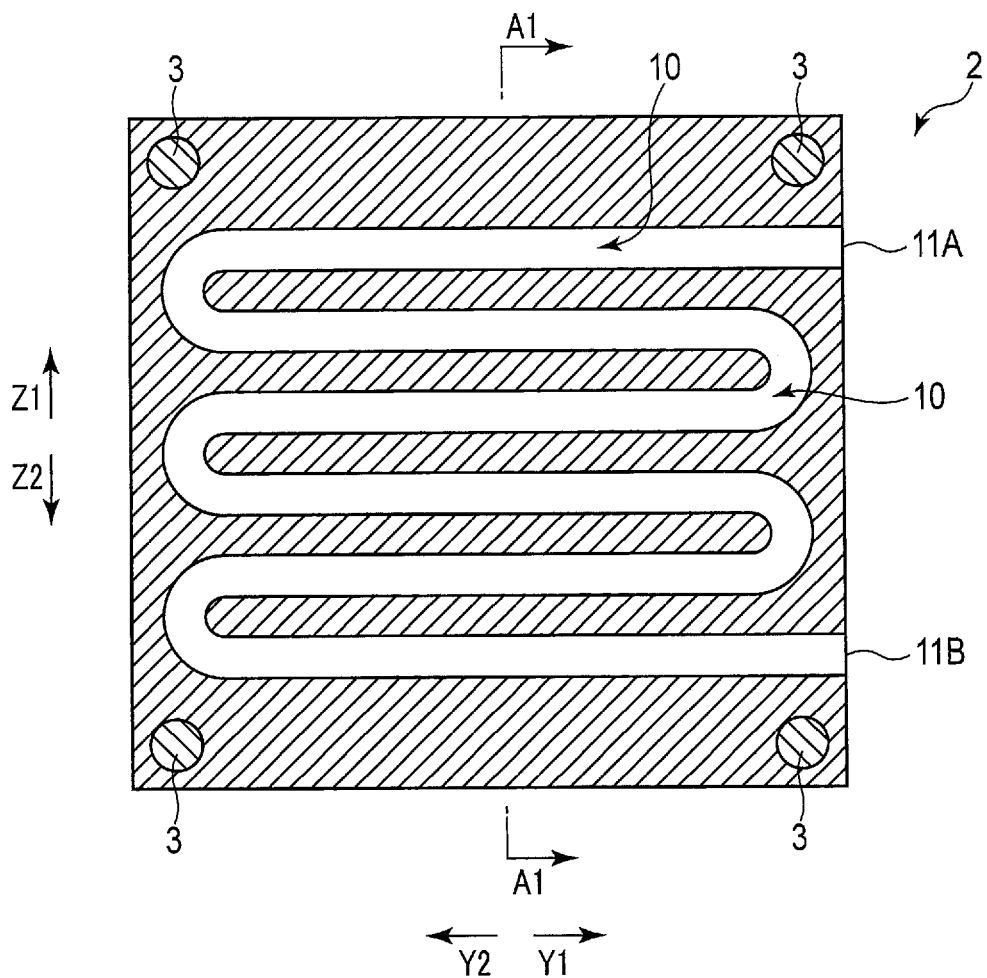
FIG. 3 is a cross-sectional view schematically showing, in a cross section perpendicular to or substantially perpendicular to a thickness direction, an arbitrary one of the constraint plates of the constraint jig according to the first embodiment.

According to one embodiment, a constraint jig, used in manufacturing of a battery in which an electrode group is stored in an exterior container having a square shape, is provided. The constraint jig includes a plurality of constraint plates made of metal. The plurality of constraint plates are arrayed, and form a space in which the battery is arranged between constraint plates that are adjacent to each other. The plurality of constraint plates constrain the battery arranged in the space, and thus prevent an expansion of the exterior container beyond a predetermined range. Each of the constraint plates has an inner hollow, and includes an inflow port that allows a cooling fluid to flow into the inner hollow and an outflow port that allows the cooling fluid to flow out of the inner hollow.

According to one embodiment, a manufacturing method of a battery is provided. In the manufacturing method, an electrode group is stored in an exterior container, and an electrolytic solution is ejected into the exterior container through a liquid injection port of the exterior container. Further, in the exterior container in which the electrode group and the electrolytic solution are stored, a temporary battery is formed by sealing the liquid injection port. Further, in a constraint jig in which a plurality of constraint plates made of metal are arrayed, the temporary battery is arranged in a space between constraint plates that are adjacent to each other, and the exterior container of the temporary battery is constrained with the plurality of constraint plates. Further, in a state in which the exterior container is constrained with the plurality of constraint plates, the temporary battery is caused to enter a charged state, and the temporary battery is held in a higher temperature than room temperature atmosphere. After the temporary battery is held in the higher temperature than room temperature atmosphere, the temporary battery is cooled by causing a cooling fluid to flow into the inner hollow of each of the constraint plates. After cooling with the cooling fluid, an opening is formed in the exterior container, and gas inside the exterior container is released through the opening to an outside of the exterior container. After releasing the gas, the opening is sealed.

Hereinafter, embodiments will be described with reference to FIGS. 1 to 13.

[Constraint Jig]

First, a constraint jig according to the embodiments will be described. The constraint jig according to the embodiments is used in manufacturing of a battery such as a secondary battery.

First Embodiment

FIGS. 1 and 2 each show a constraint jig 1 according to a first embodiment. As shown in FIGS. 1 and 2, the constraint jig 1 includes a plurality of constraint plates 2. The plurality of constraint plates 2 are arrayed in an array direction (direction indicated by arrows X1 and X2). The constraint jig 1 is defined in terms of a first direction (direction indicated by arrows Y1 and Y2) intersecting (perpendicular to or substantially perpendicular to) an array direction, and a second direction (direction indicated by arrows Z1 and Z2) intersecting both the array direction and the first direction. Herein, FIG. 1 is a perspective view, and FIG. 2 shows a state viewed from one side (arrow Y1 side) in the first direction. Among the plurality of constraint plates 2, a constraint plate 2A is arranged at one end in the array direction, and a constraint plate 2B is arranged at the other end which is opposite to the constraint plate 2A in the array direction. In the example shown in FIGS. 1 and 2, three constraint plates 2 are provided; however, the number of constraint plates is not limited in particular.

In the present embodiment, the plurality of constraint plates 2 are coupled to each other using shafts 3 and nuts 4A and 4B. The nuts 4A and 4B are provided in such a manner that the number of nuts 4A and the number of nuts 4B are equal to the number of shafts 3 and that each of the nuts 4A and each of the nuts 4B are attached to a corresponding one of the shafts 3. In the example shown in FIGS. 1 and 2, four shafts 3 are provided while four nuts 4A and four nuts 4B are provided. The constraint plates 2 are arranged at equal intervals or substantially equal intervals in the array direction. In the constraint jig 1, a space 5 is formed between the constraint plates 2 that are adjacent to each other.

Each of the constraint plates 2 is a substantially quadrilateral shape (substantially rectangular). Each of the constraint plates 2 is defined in terms of a thickness direction, a width direction intersecting (perpendicular to or substantially perpendicular to) the thickness direction, and a depth direction intersecting (perpendicular to or substantially perpendicular to) both of the thickness direction and the width direction. Each of the constraint plates 2 has a much smaller dimension in the thickness direction than a dimension in the width direction and dimension in the depth direction. Each of the constraint plates 2 is arranged in a state in which its thickness direction corresponds to or substantially corresponds to the array direction of the constraint plates 2. Each of the constraint plates 2 is arranged in a state in which its width direction corresponds to or substantially corresponds to the first direction and its depth direction corresponds to or substantially corresponds to the second direction. The plurality of constraint plates 2 have no deviation or almost no deviation from each other in the first direction and the second direction.

The outer surface of each constraint plate 2 includes one main surface (first main surface) 7A facing one side in the thickness direction and another main surface (second main surface) 7B facing the opposite side to the main surface 7A in the thickness direction. In each of the constraint jig 2 in the constraint jig 1, the main surface 7A faces one side (arrow X1 side) in the array direction, and the main surface 7B faces the other side (arrow X2 side) in the array direction. Therefore, in the constraint plates 2 that are adjacent to each other, the main surface 7A of one constraint plate 2 faces the main surface 7B of the other constraint plate 2 with the space 5 intervening therebetween. In a constraint plate 2A that is arranged at one end in the array direction, its main surface 7A faces the outside in the array direction. In a constraint plate 2B that is arranged at the other end opposite to the constraint plate 2A in the array direction, its main surface 7B faces the outside in the array direction.

Each of the shafts 3 penetrates the respective constraint plates 2 in the thickness direction. In the respective constraint plates 2, each of the shafts 3 passes by the vicinity of a corresponding one of the four corners of the substantially quadrilateral shape. In the constraint plate 2A that is arranged at one end in the array direction, each of the nuts 4A abuts on the main surface 7A from the outside in the array direction. In the constraint plate 2B that is arranged at the other end opposite to the constraint plate 2B in the array direction, each of the nuts 4B abuts on the main surface 7B from the outside in the array direction.

Each of the constraint plates 2 is made of a material having a high pressure resistance such as a metal. Each of the constraint plates 2 has a pressure resistance to the extent that deformation (plastic deformation) does not occur under the pressure of 0.5 MPa or less. Each of the constraint plates 2 preferably has a pressure resistance to the extent that deformation does not occur under the pressure of 1 MPa or less, and more preferably has a pressure resistance to the extent that deformation does not occur under the pressure of 2 MPa. Examples of a metal forming the constraint plates 2 include aluminum.

Figure 4:
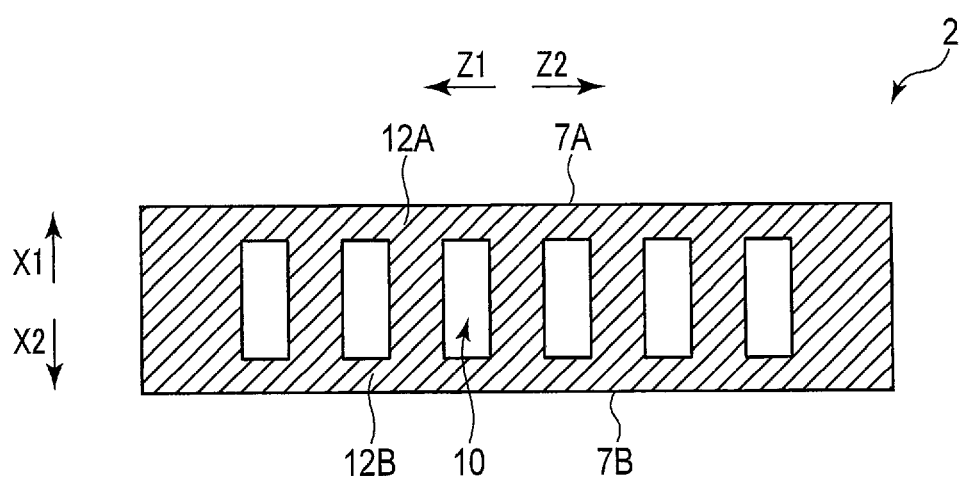
FIG. 4 is a cross-sectional view schematically showing a cross section taken along a line A1-A1 in FIG. 3

FIGS. 3 and 4 each show an arbitrary one of the constraint plates 2. Herein, FIG. 3 shows a cross section perpendicular to or substantially perpendicular to the thickness direction. FIG. 4 shows a cross section that is taken along a line A1-A1 of FIG. 3 and is perpendicular to or substantially perpendicular to the width direction. As shown in FIGS. 3 and 4, each of the constraint plates 2 has an inner hollow 10. In the example shown in FIGS. 3 and 4, the inner hollow 10 is an inner flow passage extended in a zigzag shape. Each of the constraint plates 2 has an inflow port 11A and an outflow port 11B. In each of the constraint plates 2, the inner hollow 10 is open toward the outside through the inner hollow 11A and the outflow port 11B. In each of the constraint plates 2, a cooling fluid such as a cooling liquid or cooling gas can flow into the inner hollow 10 through the inflow port 11A.

In each of the constraint plates 2, the cooling fluid can flow out of the inner hollow 10 through the outflow port 11B. In the present embodiment, in each of the constraint plates 2, the inflow port 11A is formed at one end of the inner flow passage extended in the zigzag shape, and the outflow port 11B is formed at the other end opposite to the inner port 11A in the inner flow passage extended in the zigzag shape.

Each of the constraint plates 2 includes wall portions 12A and 12B. In each of the constraint plates 2, the wall portion (first wall portion) 12A is adjacent to the inner hollow 10 from one side in the thickness direction. In each of the constraint plates 2, the wall portion (second wall portion) 12B is adjacent to the inner hollow 10 from the side opposite to the wall portion 12A in the thickness direction. Therefore, in each of the constraint plates 2 according to the present embodiment, the inner hollow 10 serving as a flow passage in a zigzag shape is formed between the wall portions 12A and 12B in the thickness direction.

In the constraint jig 1, relaying passages 13 are formed of a tube, etc. The relaying passages 13 relay between the inner hollow 10 of each of the constraint plates 2 and the inner hollow 10 of another constraint plate 2. Therefore, the inflow port 11A of one of the constraint plates 2 communicates with the outflow port 11B of another constraint plate 2 through the corresponding relaying passage 13. In the example shown in, e.g., FIGS. 1 and 2, the inflow port 11A of one of the adjacent constraint plates 2 communicates with the outflow port 11B of the other constraint plate 2 through the corresponding relaying passage 13. Since the relaying passages 13 are provided as described in the above, the inner hollows 10 of the plurality of constraint plates 2 communicate with each other through the relaying passages 13. This forms a single flow passage in which the inner hollows 10 of the plurality of constraint plates 2 communicate with each other through the relaying passages 13.

In the constraint plate 2A that is arranged at one end in the array direction, a supply tube 15A is connected to the inflow port 11A. In the constraint plate 2B that is arranged at the other end opposite to the constraint plate 2A in the array direction, an emission tube 15B is connected to the outflow port 11B. The flow passage in which the inner hollows 10 of the plurality of constraint plates 2 communicate with each other allows the aforementioned cooling fluid to flow therethrough. In the example shown in, e.g., FIGS. 1 and 2, the cooling fluid is supplied, through the supply tube 15A, into the flow passage in which the inner hollows 10 of the plurality of constraint plates 2 communicate with each other. The cooling fluid is emitted, through the emission tube 15B, from the flow passage in which the inner hollows 10 of the plurality of constraint plates 2 communicate with each other.

In a state in which the cooling fluid flows through the flow passage in which the inner hollows 10 of the plurality of constraint plates 2 communicate with each other, in each of the constraint plates 2, the cooling fluid flows into the inner hollow 10 through the inflow port 11A and flows out of the inner hollow 10 through the outflow port 11B. In an example, the cooling fluid stored in a tank, etc., is caused to flow into the aforementioned flow passage by driving a driving member such as a pump, etc. In another example, the cooling fluid is caused to flow into the aforementioned flow passage by, for example, an operator injecting the cooling fluid into the flow passage. In an example, the cooling fluid that has flowed through the aforementioned flow passage is evacuated or emitted into a discarding tank, etc. The aforementioned flow passage may be configured to allow the cooling fluid to circulate therethroughout.

(Modification)

Figure 5:
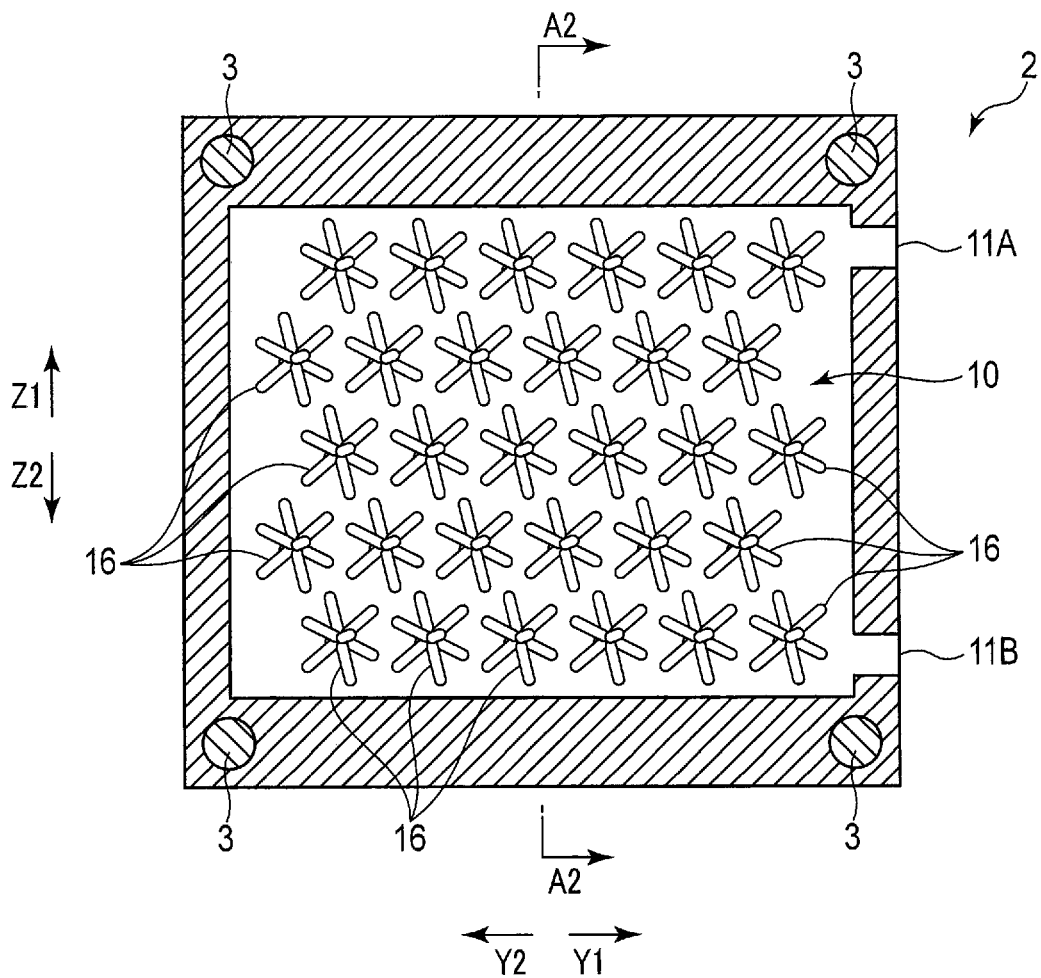
FIG. 5 is a cross-sectional view schematically showing, in a cross section perpendicular to or substantially perpendicular to a thickness direction, an arbitrary one of the constraint plates of a constraint jig according to a modification of the first embodiment.
Figure 6:
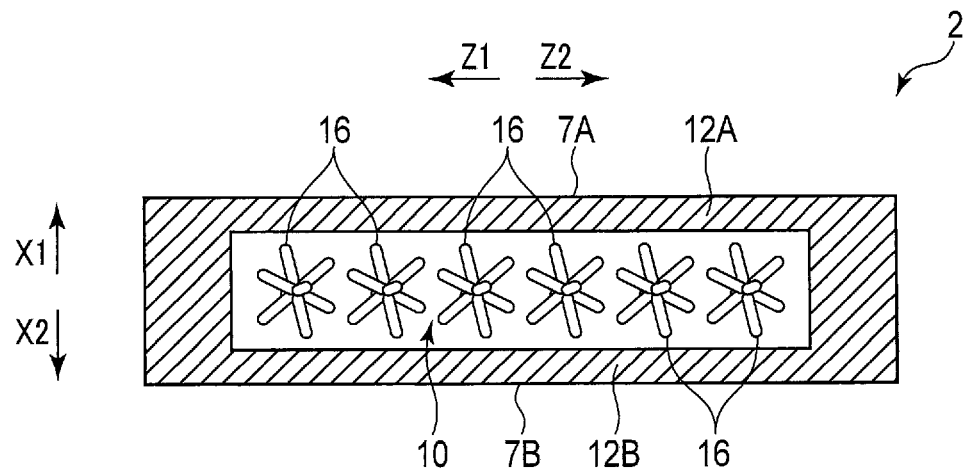
FIG. 6 is a cross-sectional view schematically showing a cross section taken along a line A2-A2 in FIG. 5.

The configuration of the inner hollows 10 of the respective constraint plates 2 is not limited to the aforementioned flow passage in the zigzag shape. In a modification shown in FIGS. 5 and 6, the inner hollow 10 is formed between the wall portions 12A and 12B in each of the constraint plates 2. However, in the present modification, the inner hollow 10 is formed into a substantially rectangular parallelepiped. In the present modification, a plurality of spacers 16 are arranged in the inner hollow 10 of each of the constraint plates 2. In each of the constraint plates 2, each of the spacers 16 is interposed between the wall portions 12A and 12B in the inner hollow 10. FIGS. 5 and 6 show an arbitrary one of the constraint plates 2. Herein, FIG. 5 shows a cross section perpendicular to or substantially perpendicular to the thickness direction. FIG. 6 shows a cross section that is taken along a line A2-A2 of FIG. 5 and is perpendicular to or substantially perpendicular to the width direction.

In an example shown in FIGS. 5 and 6, each of the spacers 16 is made of metal and includes three bar-shaped portions that are intersecting each other. Also in the present modification, each of the constraint plates 2 has a pressure resistance to the extent that deformation (plastic deformation) does not occur under the pressure of 0.5 MPa or less. Each of the constraint plates 2 preferably has a pressure resistance to the extent that deformation does not occur under the pressure of 1 MPa or less, and more preferably has a pressure resistance to the extent that deformation does not occur under the pressure of 2 MPa. Each of the constraint plates 2 includes the inflow port 11A and the outflow port 11B.

Figure 7:
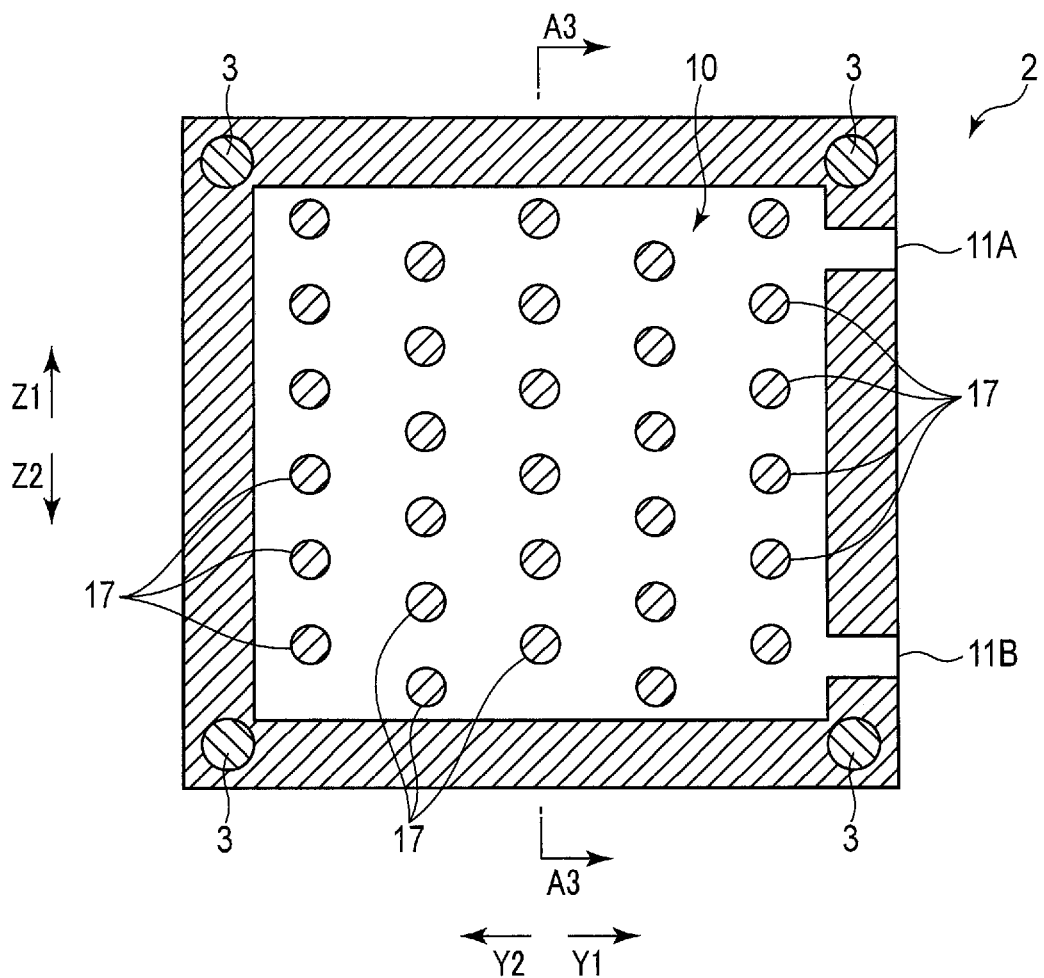
FIG. 7 is a cross-sectional view schematically showing, in a cross section perpendicular to or substantially perpendicular to a thickness direction, an arbitrary one of the constraint plates of the constraint jig according to a different modification of the first embodiment from the modification shown in FIG. 5.
Figure 8:
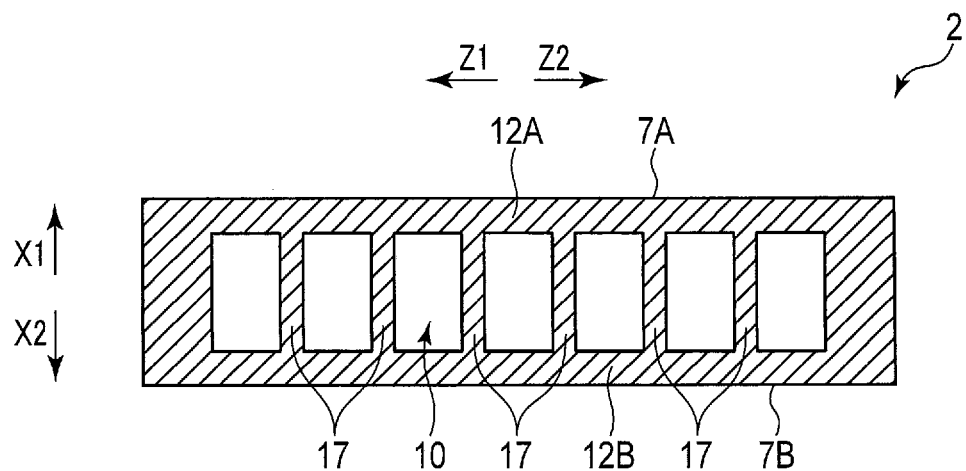
FIG. 8 is a cross-sectional diagram schematically showing a cross section taken along a line A3-A3 in FIG. 7.

Also in another modification shown in FIGS. 7 and 8, the inner hollow 10 is formed between the wall portions 12A and 12B in each of the constraint plates 2. However, in the present modification, the inner hollow 10 is formed into a substantially rectangular parallelepiped. In the present modification, a plurality of pillar-shaped portions 17 are extended in the inner hollow 10 of each of the constraint plates 2. In the inner hollow 10 of each of the constraint plates 2, each of the pillar-shaped portions 17 is continuous in the thickness direction from the wall portion (first wall portion) 12A to the wall portion (second wall portion) 12B. In the inner hollow 10 of each of the constraint plates 2, the plurality of pillar-shaped portions 17 form a lattice structure. Herein, FIG. 7 shows a cross section perpendicular to or substantially perpendicular to the thickness direction. FIG. 8 shows a cross section that is taken along a line A3-A3 of FIG. 7 and is perpendicular to or substantially perpendicular to the width direction.

Each of the pillar-shaped portions 17 is made of metal. Also in the present modification, each of the constraint plates 2 has a pressure resistance to the extent that deformation (plastic deformation) does not occur under the pressure of 0.5 MPa or less. Each of the constraint plates 2 preferably has a pressure resistance to the extent that deformation does not occur under the pressure of 1 MPa or less, and more preferably has a pressure resistance to the extent that deformation does not occur under the pressure of 2 MPa. Each of the constraint plates 2 includes the inflow port 11A and the outflow port 11B.

The configuration of the inner hollow 10 in a constraint plate 2 may differ from the configuration of the inner hollow 10 in another constraint plate 2. In a modification, the inner hollow 10 in one of the constraint plates 2 is formed in such a manner as to have a similar configuration to that of the first embodiment. In another one of the constraint plates 2, the inner hollow 10 is formed in such a manner as to have a similar configuration to that of the modification shown in FIGS. 5 and 6, etc.

In a modification, the relaying passages 13 may not be formed. In such a case, the inner hollow 10 of each of the constraint plates 2 communicates with none of the inner hollows 10 of the other constraint plates 2. The present modification requires each of the constraint plates 2 to be provided with both a supply passage that supplies the cooling fluid into the inflow port 11A of the inner hollow and an emission passage that emits the cooling fluid from the outflow port 11B of the inner hollow 10.

[Battery]

Figure 9:
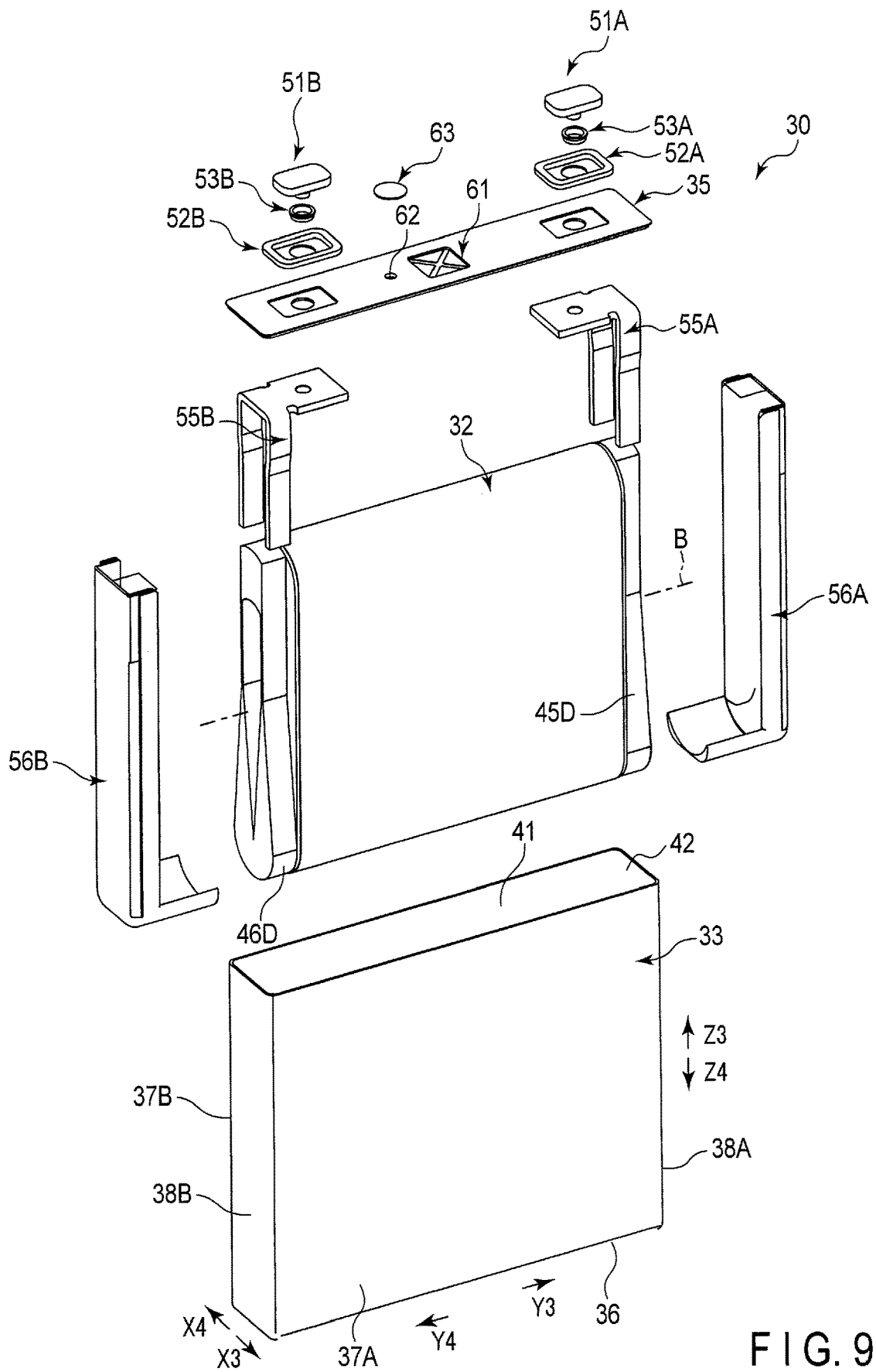
FIG. 9 is a perspective view schematically showing an exemplary battery manufactured using the constraint jig according to the embodiment in a state in which the battery is disassembled into components.
Figure 10:
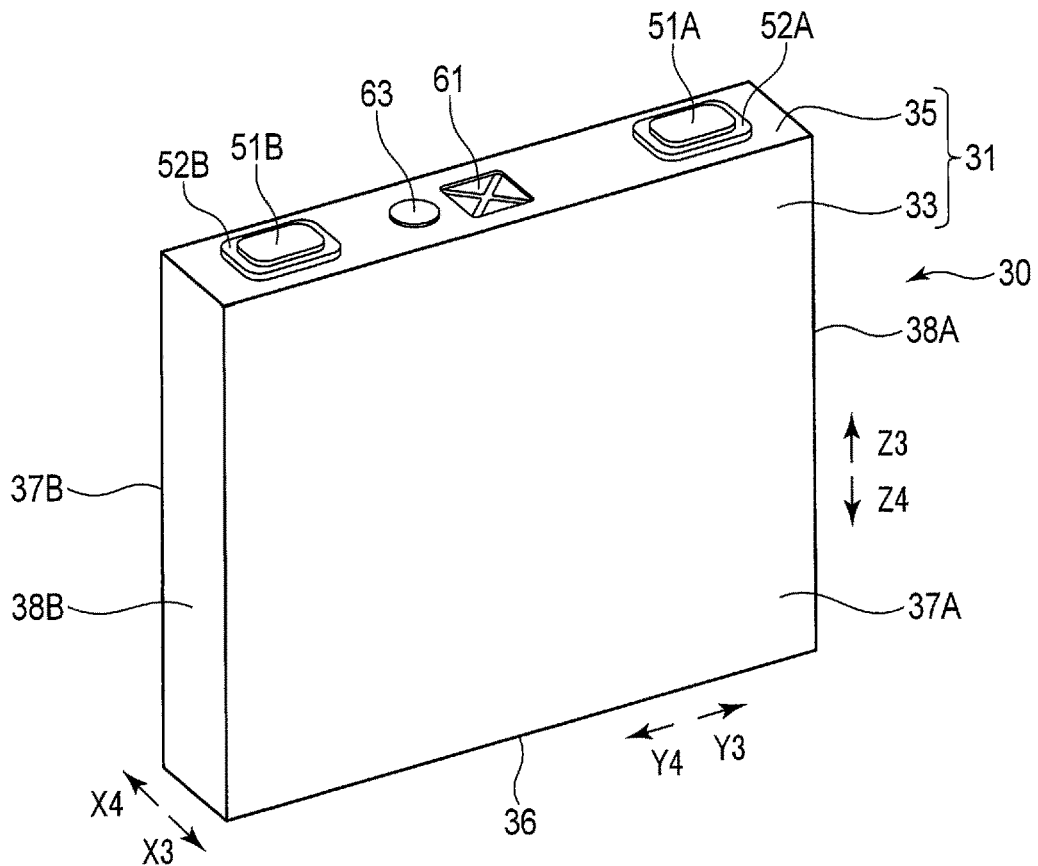
FIG. 10 is a perspective view schematically showing the exemplary battery shown in FIG. 9 in a state in which the components are assembled with each other.

Next, a battery manufactured using the constraint jig 1 described in the above will be described. Examples of the battery include a secondary battery. Examples of the battery further include a nonaqueous electrolyte battery. FIGS. 9 and 10 each show one example of a battery 30 manufactured using the constraint jig 1. FIG. 9 shows the battery 30 in a state in which it is disassembled into components. FIG. 10 shows the battery 30 in a state in which the components are assembled with each other. As shown in FIGS. 9 and 10, the battery 30 includes an exterior container 31, an electrode group 32 stored in the exterior container 31, and an electrolytic solution impregnated (held) in the electrode group 32.

Here, the battery 30 is defined in terms of a depth direction (direction indicated by arrows X3 and X4), a lateral direction (direction indicated by arrows Y3 and Y4) intersecting (perpendicular to or approximately perpendicular to) the depth direction, and a height direction (direction indicated by arrows Z3 and Z4) intersecting (perpendicular to or approximately perpendicular to) both the depth direction and the lateral direction. The depth direction of the battery 30 corresponds to or substantially corresponds to the depth direction of the exterior container 31, and the lateral direction of the battery 30 corresponds to or substantially corresponds to the lateral direction of the exterior container 31. The height direction of the battery 30 corresponds to the height direction of the exterior container 31.

The exterior container 31 is made of, for example, metal. The exterior container 31 has a much smaller dimension in the depth direction than a dimension in the lateral direction and a dimension in the height direction. Therefore, the battery 30 has a much smaller dimension in the depth direction than a dimension in the lateral direction and a dimension in the height direction. In the battery 30, the exterior container 31 is formed into a square shape (rectangular parallelepiped shape). The exterior container 31 includes a container body 33 and a lid 35. The container body 33 includes a bottom wall 36 and side walls 37A, 37B, 38A, and 38B.

Inside the container body 33, the bottom wall 36 and the side walls 37A, 37B, 38A, and 38B form a storage hollow in which the electrode group 32, the electrolytic solution, etc., are stored. The storage hollow 41 is open in an opening 42 toward one side (arrow Z3 side) in the height direction of the exterior container 31. Furthermore, in the exterior container 31, the bottom wall 36 is arranged apart from the opening 42 in the height direction with the storage hollow 41 intervening therebetween, and the bottom wall 36 forms an end surface on a side (arrow Z4 side) opposite to the opening 42 in the height direction. The lid 35 is attached to the container body 33 at the opening 42, thereby closing the opening 42. With the configuration described in the above, in the exterior container 31, the dimension from the outer surface of the lid 35 to the outer surface of the bottom wall 36 is equal to or substantially equal to the dimension in the height direction.

The side walls 37A, 37B, 38A, and 38B extend from the bottom wall 36 to the lid 35 (opening 42) in the height direction. The side walls 37A and 37B are arranged apart from each other in the depth direction with the storage hollow 41 intervening therebetween, while the side walls 38A and 38B are arranged apart from each other in the lateral direction with the storage hollow 41 intervening therebetween. Each of the side walls 37A and 37B is extended in the lateral direction from the side wall 38A to the side wall 38B, while each of the side walls 38A and 38B is extended in the depth direction from the side wall 37A to the side wall 37B. In the exterior container 31, a dimension from the outer surface of the side wall 37A to the outer surface of the side wall 37B is equal to or substantially equal to a dimension in the depth direction. In the exterior container 31, a dimension from the outer surface of the side wall 38A to the outer surface of the side wall 38B is equal to or substantially equal to a dimension in the lateral direction.

Figure 11:
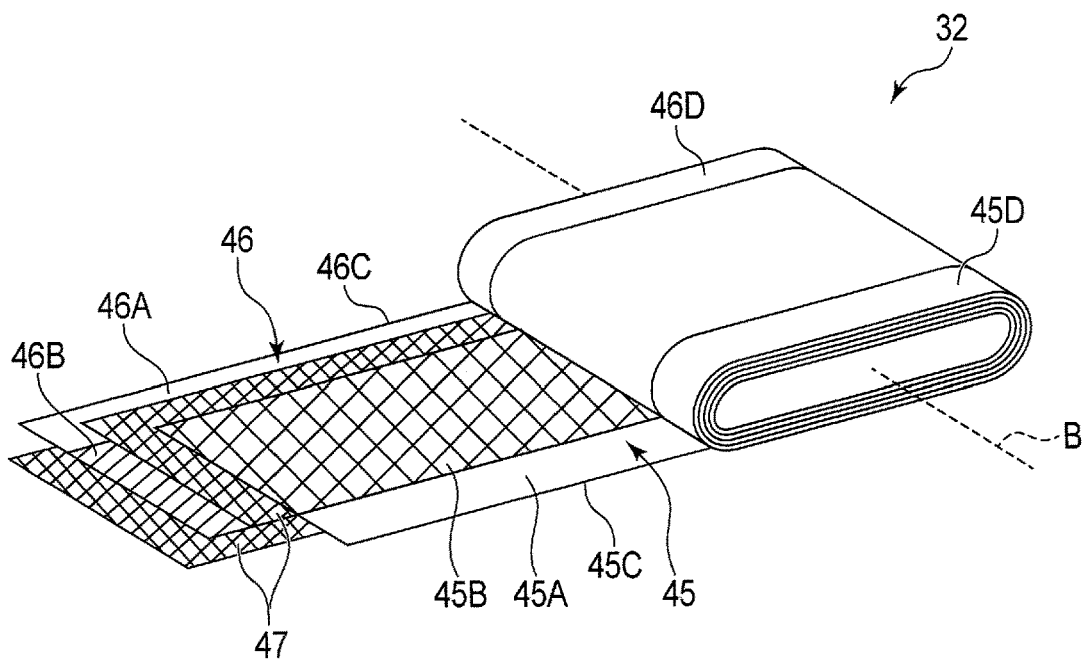
FIG. 11 is a perspective view schematically showing an exemplary configuration of an electrode group used in the exemplary battery shown in FIG. 9.

FIG. 11 shows an exemplary configuration of the electrode group 32. In the example shown in FIG. 11, the electrode group 32 is formed into a flat shape, for example, and includes a positive electrode 45, a negative electrode 46, and separators 47. The positive electrode 45 includes a positive electrode current collecting foil 45A serving as a positive electrode current collector, and a positive electrode active material-containing layer 45B supported on the surface of the positive electrode current collecting foil 45A. Furthermore, the negative electrode 46 includes a negative electrode current collecting foil 46A serving as a negative electrode current collector, and a negative electrode active material-containing layer 46B supported on the surface of the negative electrode current collecting foil 46A.

In the positive electrode current collecting foil 45A, one long side edge 45C and a portion in the vicinity thereof form a positive electrode current collecting tab 45D. In the positive electrode current collecting tab 45D, the positive electrode active material-containing layer 45B is not supported on the surface of the positive electrode current collecting foil 45A. In the negative electrode current collecting foil 46A, one long side edge 46C and a portion in the vicinity thereof form a negative electrode current collecting tab 46D. In the negative electrode current collecting tab 46D, the negative electrode active material-containing layer 46B is not supported on the surface of the negative electrode current collecting foil 46A.

In the electrode group 32 in one example shown in FIG. 11, the positive electrode 45, the negative electrode 46, and the separators 47 are wound around a winding axis B to form a flat shape with the separator 47 intervening between the positive electrode active material-containing layer 45B and the negative electrode active material-containing layer 46B. At this time, for example, the positive electrode 45, the separator 47, the negative electrode 46, and the separator 47 are wound together in a state in which they are stacked in this order. In the electrode group 32 in one example shown in FIG. 11, the positive electrode current collecting tab 45D of the positive electrode current collecting foil 45A protrudes from the negative electrode 46 and the separators 47 toward one side in a direction along the winding axis B. The negative electrode current collecting tab 46D of the negative electrode current collecting foil 46A protrudes from the positive electrode 45 and the separators 47 toward a side opposite to the side toward which the positive electrode current collecting tab 45D protrudes in the direction along the winding axis B.

As shown in FIG. 9, etc., the electrode group 32 is arranged inside the storage hollow 41 with the winding shaft B extended along the lateral direction of the exterior container 31 (battery 30). Thus, in the electrode group 32 to be arranged in the storage hollow 41 of the exterior container 31, the positive electrode current collecting tab 45D protrudes from the negative electrode 46 toward one side in the lateral direction of the exterior container 31 (battery 30). In the electrode group 32, the negative electrode current collecting tab 46D protrudes from the positive electrode 45 toward a side opposite to the side toward which the positive electrode current collecting tab 45D protrudes in the lateral direction of the exterior container 31 (battery 30).

In the battery 30, a positive electrode terminal 51A and a negative electrode terminal 51B are attached as a pair of electrode terminals to the outer surface of the lid 35. The electrode terminals 51A and 51B are arranged apart from each other in the lateral direction of the battery 30. Furthermore, each of the electrode terminals 51A and 51B protrudes toward one side (arrow Z3 side) in the height direction on the outer surface of the outer surface of the lid 35. The battery 30 is further provided with insulators 52A and 52B and insulating gaskets 53A and 53B. The positive electrode terminal 51A is prevented by the insulator 52A and the insulating gasket 53A from coming into contact with the exterior container 31, thereby being electrically insulated from the exterior container 31. Similarly, the negative electrode terminal 51B is prevented by the insulator 52B and the insulating gasket 53B from coming into contact with the exterior container 31, thereby being electrically insulated from the exterior container 31.

In the storage hollow 41 of the exterior container 31, one or more positive electrode leads including a lead 55A and one or more negative electrode leads including a lead 55B are stored. The positive electrode terminal 51A is electrically connected to the positive electrode current collecting tab 45D of the positive electrode 45 with one or more positive electrode leads (including the lead 55A) intervening therebetween. The negative electrode terminal 51B is electrically connected to the negative electrode current collecting tab 46D of the negative electrode 46 with one or more negative electrode leads (including the lead 55B) intervening therebetween. Connection of each of the positive electrode current collecting tab 45D and the negative electrode current collecting tab 46D to a lead and interconnection between the leads are performed by, for example, welding such as ultrasonic welding or laser welding. Furthermore, connection of each of the electrode terminals 51A and 51B to the lead is performed by, for example, a fixation by caulking.

Electrode guards 56A and 56B are stored in the storage hollow 41 of the exterior container 31. Each of the electrode guards 56A and 56B has an electrical insulation property. The positive electrode leads such as the lead 55A and the positive electrode current collecting tab 45D are prevented by the electrode guard 56A from coming into contact with the exterior container 31, thereby being electrically insulated from the exterior container 31. Similarly, the negative electrode leads such as the lead 55B and the negative electrode current collecting tab 46D are prevented by the electrode guard 56B from coming into contact with the exterior container 31, thereby being electrically insulated from the exterior container 31.

The lid 35 of the exterior container 31 is provided with a gas release valve 61 and a liquid injection port 62. The gas release valve 61 and the liquid injection port 62 are arranged between the electrode terminals 51A and 51B in the lateral direction of the battery 30. In the lid 35, the liquid injection port 62 is formed in the vicinity of the gas release valve 61. The gas release valve 61 is formed to be thinner than the remaining regions of the lid 35. The sealing plate 63 is welded to the outer surface of the lid 35. The sealing plate 63 is formed of a metal such as aluminum, an aluminum alloy, etc. The liquid injection port is closed with the sealing plate 63, thereby being sealed.

Hereinafter, the positive electrode 45, the negative electrode 46, the separators 47, the electrolytic solution, and the exterior container 31 will be described in detail. A configuration and a shape of the electrode group 32 will be described in detail.

1) Positive Electrode

The positive electrode may include a positive electrode current collector, and a positive electrode active material-containing layer formed on part of the surface of the current collector. The positive electrode current collector is an aluminum foil, an aluminum alloy foil, etc., and has a thickness of 10 μm to 20 μm.

The positive electrode active material-containing layer may include a positive electrode active material, and optionally, an electro-conductive agent and a binder. As the positive electrode active material, for example, an oxide or a sulfide may be used. Examples of the positive electrode active material include but are not limited to an oxide, a sulfide, a polymer, etc., that can occlude and release lithium ions. As the positive electrode active material, it is preferable to use a lithium manganese composite oxide, a lithium nickel composite oxide, a lithium cobalt composite oxide, a lithium iron phosphate, etc., from the viewpoint of obtaining a high positive electrode electric potential.

2) Negative Electrode

The negative electrode may include a negative electrode current collector, and a negative electrode active material-containing layer formed on part of the surface of the negative electrode current collector. The negative electrode current collector is an aluminum foil, an aluminum alloy foil, a copper foil, etc., and has a thickness of 10 μm to 20 μm.

The negative electrode active material-containing layer may include a negative electrode active material, and optionally, an electro-conductive agent and a binder. As the negative electrode active material, a material that can occlude and release lithium ions, such as a metal oxide, a metal nitride, an alloy, carbon, etc., may be used. Examples of the negative electrode active material include but are not limited to a metal oxide, a metal sulfide, a metal nitride, a carbon material, etc., that can occlude and release lithium ions. As the negative electrode active material, in particular, it is preferable to use a material that occludes and releases lithium ions at a noble electric potential of 0.4 V or more in comparison to an electric potential of metal lithium, that is, a material capable of occluding and releasing lithium ions at a noble electric potential of 0.4 V (vs. $Li^+/Li$) or more. The use of a negative electrode active material which occludes and releases lithium ions at such a noble electric potential inhibits an alloy reaction between aluminum or an aluminum alloy and lithium. This allows the use of aluminum or an aluminum alloy for a negative electrode current collector and negative electrode-related constituent members. Examples of a negative electrode active material which occludes and releases lithium ions at a noble electric potential of 0.4 V (vs. Li$^+$/Li) or more include a titanium oxide, a lithium titanium composite oxide such as lithium titanate, a tungsten oxide, an amorphous tin oxide, a niobium titanium composite oxide, a tin silicon oxidate, a silicon oxide, etc., and it is particularly preferable to use the lithium titanium composite oxide as the negative electrode active material. When a carbon material which occludes and releases lithium ions is used as the negative electrode active material, a copper foil is preferably used as the negative current collector. A carbon material used as the negative electrode active material occludes and releases lithium ions at a noble electric potential of about 0 V (vs. Li$^+$/Li).

It is desirable that an aluminum alloy used for the positive electrode current collector and the negative electrode current collector include one or two or more elements selected from Mg, Ti, Zn, Mn, Fe, Cu, and Si. A purity of aluminum and an aluminum alloy may be set to 98% by weight or more, and preferably 99.99% by weight or more. Furthermore, pure aluminum with a purity of 100% is usable as a material for the positive electrode current collector and/or the negative electrode current collector. A content of a transition metal such as nickel, chromium, etc., contained in aluminum and an aluminum alloy is preferably 100 wt.ppm or less (including 0 wt.ppm).

3) Separator

A separator may be made of, for example, a porous film including polyethylene, polypropylene, cellulose, or polyvinylidene fluoride (PVdF), or be made of a synthetic resin nonwoven fabric. In particular, a porous film made from polyethylene or polypropylene is melted so that current can be interrupted at a certain temperature. Thus, such a porous film can increase safety.

The separator may be a separate sheet, etc. from the positive electrode and the negative electrode, or may be integrated with one of the positive electrode and the negative electrode. The separator may be made of an organic material, an inorganic material, or a mixture of an organic material and an inorganic material. Examples of an organic material that forms the separator include engineering plastic and super engineering plastic. Examples of engineering plastics include polyamide, polyacetal, polybutylene terephthalate, polyethylene terephthalate, syndiotactic polystyrene, polycarbonate, polyamide imide, polyvinyl alcohol, polyvinylidene fluoride, modified polyphenylene ether, etc. Examples of super engineering plastics include polyphenylene sulfide, polyetheretherketone, liquid crystal polymer, polyvinylidene fluoride, polytetrafluoroethylene (PTFE), polyethernitrile, polysulfone, polyacrylate, polyetherimide, thermoplastic polyimide, etc. Examples of an inorganic material that forms the separator include oxides (for example, aluminum oxide, silicon dioxide, magnesium oxide, phosphorus oxide, calcium oxide, iron oxide, and titanium oxide), and nitrides (for example, boron nitride, aluminum nitride, silicon nitride, and barium nitride), etc.

As the separator, a solid electrolyte may be used. In such a case, in the electrode group, a solid electrolyte is interposed between the positive electrode and the negative electrode. By this, the solid electrolyte achieves electrical isolation between the positive electrode and the negative electrode.

4) Electrolyte Solution

As the electrolytic solution impregnated into the electrode group, for example, a nonaqueous electrolyte is usable. A nonaqueous electrolyte may be prepared by, for example, dissolving an electrolyte in an organic solvent. It is preferable that the liquid nonaqueous electrolyte solution be obtained by dissolving an electrolyte in an organic solvent at a concentration of 0.5 mol/L or more and 2.5 mol/L or less.

Examples of the electrolyte dissolved in the organic solvent include lithium salts such as lithium perchlorate (LiClO$_4$), lithium hexafluorophosphate (LiPF$_6$), lithium tetrafluoroborate (LiBF$_4$), lithium arsenic hexafluoride (LiAsF$_6$), trifluoromethane lithium sulfonate (LiCF$_3$SO$_3$) and lithium bistrifluoromethylsulfonylimide [LiN(CF$_3$SO$_2$)$_2$], and mixtures thereof. An electrolyte that is difficult to oxidize even at a high electric potential is preferable, and LiPF$_6$ is most preferable.

Examples of the organic solvent include cyclic carbonates such as propylene carbonate (PC), ethylene carbonate (EC), and vinylene carbonate; linear carbonate such as diethyl carbonate (DEC), dimethyl carbonate (DMC), and methyl ethyl carbonate (MEC); cyclic ethers such as tetrahydrofuran (THF), 2-methyltetrahydrofuran (2MeTHF) and dioxolane (DOX); linear ethers such as dimethoxyethane (DME) and diethoxyethane (DEE); and γ-Butyrolactone (GBL), acetonitrile (AN), and sulfolane (SL). These organic solvents are usable alone or as a mixed solvent.

Furthermore, the electrolytic solution may be an aqueous electrolytic solution such as an aqueous solution.

5) Exterior Container

As the exterior container, a metal container having a square shape (rectangular parallelepiped shape) such as the aforementioned exterior container 31 is usable. As the metal container, for example, a metal container having a thickness of 1 mm or less is usable. It is more preferable that a metal container have a thickness of 0.5 mm or more.

The metal container is made of, for example, aluminum or an aluminum alloy. The aluminum alloy is preferably an alloy containing an element such as magnesium, zinc, silicon, etc. When the alloy contains a transition metal such as iron, copper, nickel, chromium, etc., a content of such a transition metal is preferably 1% by weight or less.

6) Configuration and Shape of Electrode Group

The electrode group can adopt any configuration as long as the positive electrode active material and the negative electrode active material face each other with the separator being interposed therebetween. As the separator, a solid electrolyte is usable.

For example, the electrode group may have a stack-type configuration. The stack-type configuration has a structure in which the positive electrode and the negative electrode are stacked with the separator being interposed therebetween. Alternatively, the electrode group may have a wound-type configuration. In the wound-type configuration, the above-described positive electrode and negative electrode are stacked with the separator being interposed therebetween. In the wound-type configuration, furthermore, the stacked body in which the electrode and negative electrode are stacked is wound into a spiral form or into a flat spiral form. A general shape of the electrode group may be determined in conformity with a container in which the electrode group is stored.

[Manufacturing Method of Battery]

Next, a manufacturing method of a battery such as the aforementioned battery 30 will be described. In the embodiment, etc., the aforementioned constraint jig 1 is used in manufacturing of a battery.

In manufacturing of the battery 30, the electrode group 32 is formed as described in the above, and the formed electrode group 32 is dried. In the electrode group 32, the positive electrode current collecting tab 45D is then connected to the positive electrode lead, and the negative electrode current collecting tab 46D is connected to the negative electrode lead. The current collecting tabs 45D and 46D are respectively connected to the leads by welding, etc. The electrode guard 56A is attached to the positive electrode current collecting tab 45D in the electrode group 32 and is fixed to the electrode group 32 by means of, e.g., an insulating tape (not shown). Similarly, the electrode guard 56B is attached to the negative electrode current collecting tab 46D in the electrode group 32 and is fixed to the electrode group 32 by means of, e.g., an insulating tape (not shown).

The positive electrode terminal 51A is then attached to the outer surface of the lid 35 and is also connected to the positive electrode side lead. Similarly, the negative electrode terminal 51B is attached to the outer surface of the lid 35 and is also connected to the negative electrode side lead. The attachment of the electrode terminals 51A and 51B to the lid 35 and the connection of each of the electrode terminals 51A and 51B to the lead are performed by a fixation by caulking. By the components being assembled as described in the above, the electrode group 32, the lid 35, the electrode terminals 51A and 51B, the positive electrode side leads (including the lead 55A), the negative electrode side leads (including the lead 55B), and the electrode guards 56A and 56B are integrated. The positive electrode current collecting tab 45D is electrically connected to the positive electrode terminal 51A, and the negative electrode current collecting tab 46D is electrically connected to the negative electrode terminal 51B.

The assembled body in which the aforementioned components, etc., are assembled is inserted into the storage hollow 41 of the container body 33. In this manner, the electrode group 32, etc. is stored in the storage hollow 41 of the exterior container 31. In the opening 42 of the storage hollow 41, the lid 35 is attached to the container body 33. In this manner, the opening 42 is closed with the lid 35. The lid 35 is fixed to the container body 33 by welding, etc.

Water remaining in the storage hollow 41 of the exterior container 31 is released through the liquid injection port 62 of the exterior container 31. The electrolytic solution is then injected through the liquid injection port 62 into the storage hollow 41 inside the exterior container 31. Thereafter, this liquid injection port 62 is sealed (temporarily sealed). At this time, for example, the liquid injection port 62 is sealed by attaching a plug, which is different from the sealing plate 63, to the liquid injection port 62. This forms the battery (temporary battery) in which the liquid injection port 62 is sealed with the plug instead of the sealing plate 63.

Figure 12:
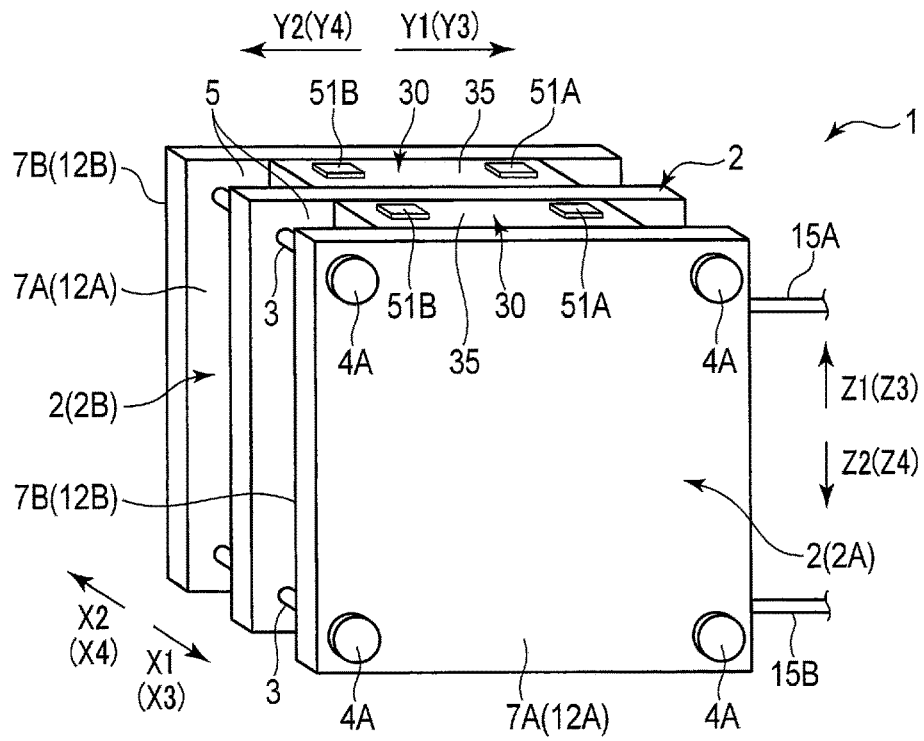
FIG. 12 is a perspective view schematically showing a state in which a battery is arranged in a space between constraint plates when the battery is manufactured using the constraint jig according to the embodiment.
Figure 13:
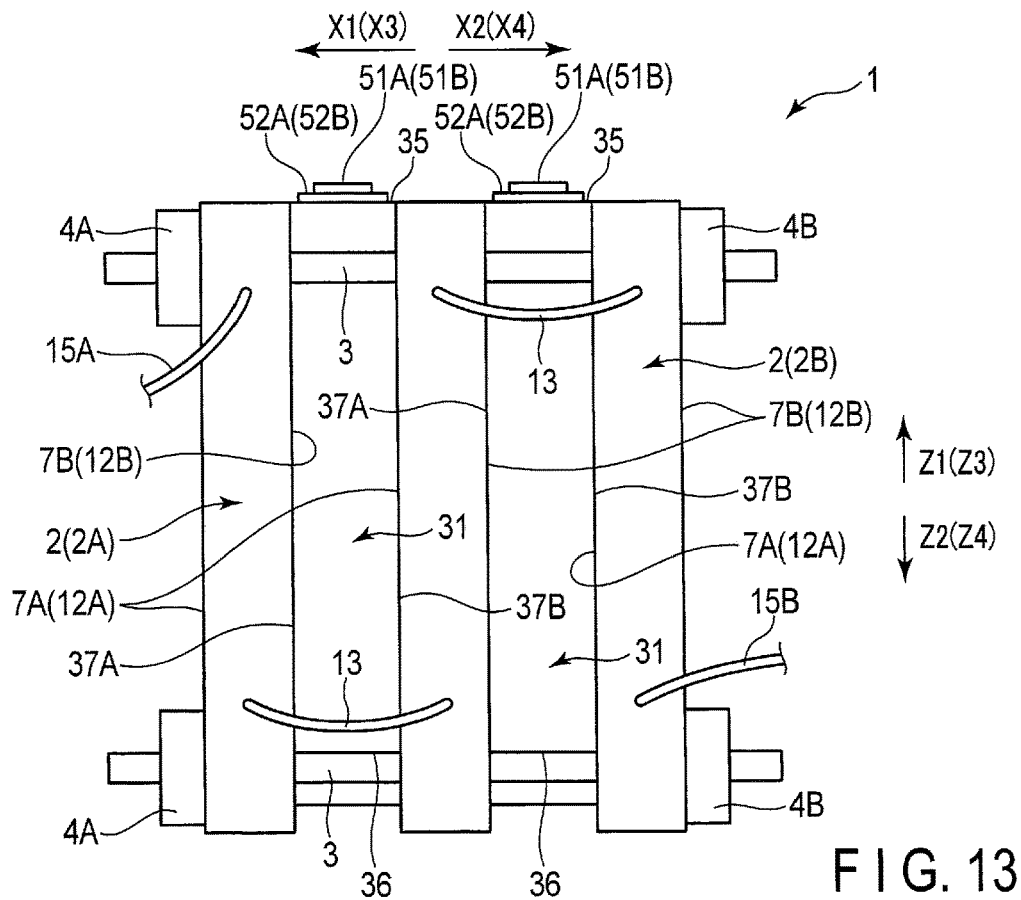
FIG. 13 is a schematic view showing a state in which a battery is arranged in a space between constraint plates when the battery is manufactured using the constraint jig according to the embodiment, and the constraint jig is viewed from one side in the first direction of the constraint jig.

In the constraint jig 1 described in the above, the battery 30 (temporary battery) is arranged in the space 5 between the constraint plates 2 that are adjacent to each other. At this time, the battery 30 is arranged in the space 5 in a state in which the electrode group 32 is stored in the exterior container 31 and the liquid injection port 62 is sealed. FIGS. 12 and 13 show a state in which the battery 30 (temporary battery) is arranged in the space 5 of the constraint jig 1. Herein, FIG. 12 is a perspective view, and FIG. 13 shows a state viewed from one side (arrow Y1 side) in the first direction of the constraint jig 1. In FIG. 12, the insulators 52A and 52B described in the above are omitted.

As shown in FIGS. 12 and 13, the battery 30 is arranged in a state in which its height direction corresponds to or substantially corresponds to the second direction of the constraint jig 1. Furthermore, the battery 30 is arranged in the space 5 in a state in which the depth direction of the battery 30 corresponds to or substantially corresponds to the array direction of the constraint plate 2, and the lateral direction of the battery 30 corresponds to or substantially corresponds to the first direction of the constraint jig 1. The battery 30 is arranged in a state in which the outer surface of the side wall 37A of the exterior container 31 faces or is in contact with the main surface 7B of a corresponding one of the constraint plates 2. The battery 30 is arranged in a state in which the outer surface of the side wall 37B of the exterior container 31 faces or is in contact with the main surface 7A of a corresponding one of the constraint plates 2.

The battery 30 (temporary battery) is arranged in a state in which the outer surface of the lid 35 of the exterior container 31 is flush with or approximately flush with each of the constraint plates 2. Therefore, in the battery 30 arranged in the space 5 as described in the above, the electrode terminals 51A and 51B protrude from the respective constraint plates 2 toward one side (arrow Z1 side) in the second direction of the constraint jig 1. That is, the battery 30 is arranged in such a manner that the electrode terminals 51A and 51B protrude from the respective constraint plates 2 toward the outer side of the constraint jig 1. In an example, the battery 30 may be arranged in a state in which the electrode terminals 51A and 51B do not protrude from the respective constraint plates 2 to the outer side.

By arranging the battery 30 in the space 5 as described in the above, the exterior container 31 of the battery 30 is constrained with the constraint plates 2. By this, the expansion of the exterior container 31 beyond a predetermined range (predetermined dimension) is suppressed by the constraint plates 2. This effectively prevents plastic deformation, etc., of the exterior container 31. As described in the above, each of the constraint plates 2 has a pressure resistance to the extent that deformation (plastic deformation) does not occur under the pressure of 0.5 MPa or less. In an example, each of the constraint plates 2 has a pressure resistance to the extent that deformation does not occur under the pressure of 2 MPa or less. Therefore, each of the constraint plates 2 is not deformed even under the pressure in excess of a pressure upper limit value of the battery 30. Herein, the pressure upper limit value of the battery 30 means an upper limit value of a pressure range in which the exterior container 31 of the battery 30 is not deformed (plastically deformed).

The battery 30 (temporary battery) is charged (charged for the first time) by passing a current between the electrode terminals 51A and 51B in a state in which the battery 30 is arranged in the space of the constraint jig 1. After charging is performed, charging and discharging may be repeatedly performed. As described in the above, by at least charging the battery 30, a state of charge (SOC) of the battery 30 is adjusted to fall within a predetermined range. For example, a state of charge of the battery 30 is adjusted, by charging or charging-and-discharging, to fall within a predetermined range of greater than 0% and less than 20%. By adjusting the state of charge as described in the above, the battery 30 enters a charged state in which the state of charge is greater than 0%. The state of charge (SOC) corresponds to the ratio of a charge capacity to a full charge capacity of the battery 30 (temporary battery). Accordingly, in the case where the charge capacity of the battery 30 corresponds to the full charge capacity, its state of charge is equal to 100%.

When the battery enters a charged state by charging or charging-and-discharging, the battery 30 (temporary battery) including the exterior container 31 and the electrode group 32 is held in a higher temperature than room temperature atmosphere. For example, the battery 30 is held in an atmosphere of 50° C. or higher and 90° C. or lower. That is, the battery 30 is aged in a relatively high temperature atmosphere. At this time, the battery 30 is arranged in the space 5 of the restraint jig 1, and the exterior container 31 of the battery 30 is constrained with the constraint plates 2.

Impurities such as water and carbon dioxide are adhered to the electrode group 32, etc., which is stored in the storage hollow 41 of the exterior container 31. Therefore, manufacturing of the battery 30 involves adjustment of a state of charge and aging in a high temperature atmosphere described in the above, so that gas is generated in the storage hollow 41 by, e.g., electrolysis of water adhering to the electrode group 32, etc. Then, impurities such as water and carbon dioxide adhering to the electrode group 32, etc., are released as gas from the electrode group 32, etc. to the storage hollow 41.

The aforementioned impurities are easily released as gas from the electrode group 32, etc., in a state in which the negative electrode 46 has a low electric potential. Therefore, by setting a state of charge of the battery 30 (temporary battery) to less than 20%, the reaction for generating gas can be promoted. In the case where the state of charge of the battery 30 is high and the electric potential of the positive electrode 45 is high, gas released from the negative electrode 46 is oxidized by the positive electrode 45, thereby being easily absorbed again by the electrode group 32, etc. Therefore, by setting the state of charge of the battery 30 to less than 20%, the oxidation reaction at the positive electrode 45 can be suppressed and the release of gas from the electrode group 32 can be promoted. In a state in which neither charging nor charging-and-discharging is performed, that is, a state in which the state of charge of the battery 30 is 0% (a case in which the battery 30 is not in a charged state), gas is not released from the electrode group 32, etc., even if aging is performed in a high temperature atmosphere.

Furthermore, even when the state of charge is adjusted by charging or charging-and-discharging as described in the above, if the battery 30 is held in an atmosphere of less than 50° C., gas is not sufficiently released from the electrode group 32, etc. Furthermore, in the case where aging is performed in an atmosphere exceeding 90° C., the reaction of electrolytic solution, etc. is likely to occur on the surfaces of the positive electrode 45 and the negative electrode 46. Therefore, in the case where aging is performed in an atmosphere exceeding 90° C., the impedance of the electrode group 32 may increase due to, e.g., the formation of a film on the surface of the electrode group 32, etc., and the discharge capacity of the battery 30 may decrease. Therefore, the battery 30 is aged in an atmosphere of 50° C. or higher and 90° C. or lower, and more preferably, the battery 30 is aged in an atmosphere of 60° C. or higher and 80° C. or lower.

Furthermore, it is only required that a time period during which the battery 30 is held in an atmosphere at a temperature of 50° C. or higher and 90° C. or lower be a time period during which gas is sufficiently released from the electrode group 32. In an example, a time period during which the battery 30 is held in a high temperature atmosphere may be 5 or more hours and 50 or fewer hours, preferably 10 or more hours and 40 or fewer hours.

Furthermore, during aging in a high temperature atmosphere, the battery 30 is constrained with the constraint plates 2. Therefore, even if gas is generated in the storage hollow 41 as described in the above, the expansion of the exterior container 31 beyond a predetermined range is suppressed by the constraint plates 2. Therefore, even if gas is generated in the storage hollow 41 due to, e.g., aging in a high temperature atmosphere, the plastic deformation of the exterior container 31, etc., is effectively prevented. Furthermore, as described in the above, since the expansion of the exterior container 31 is suppressed by the constraint plates 2, the pressure of the storage hollow 41 increases when gas is generated in the storage hollow 41 due to, e.g., the aging in a high temperature atmosphere. The increased pressure makes the storage hollow 41 higher in pressure than the outside of the exterior container 31 (battery 30).

Then, after gas is generated by, e.g., aging in a high temperature atmosphere, a cooling fluid such as a cooling gas or a cooling liquid is caused to flow into the internal hollow 10 of each of the constraint plates 2. Thereafter, each of the constraint plates 2 is cooled, and the battery 30 (temporary battery) arranged in the space 5 is cooled. Accordingly, the exterior container 31 and the electrode group 32 are cooled. Cooling with a cooling fluid is performed in a normal temperature atmosphere such as a room temperature of about 25° C. By cooling with a cooling fluid, the constraint plates 2 and the battery 30 (including the exterior container 31 and the electrode group 32) are cooled to a temperature lower than room temperature (normal temperature). In an example, the constraint plates 2 and the battery 30 are cooled with a cooling fluid to a temperature of 20° C. or lower.

When the temperature of the battery 30 (the exterior container 31 and the electrode group 32) drops to a temperature lower than room temperature (normal temperature) by cooling with a cooling fluid, the plug attached to the liquid injection port 62 is detached. In this manner, the liquid injection port 62 is formed, as the opening of the storage hollow 41, in the exterior container 31. As described in the above, gas is generated in the storage hollow 41 by, e.g., aging in a high temperature atmosphere, which makes the storage hollow 41 higher in pressure than the outside of the exterior container 31 (battery 30). Therefore, by the storage hollow 41 being open in the liquid injection port 62, gas generated by, e.g., aging in a high temperature atmosphere is released from the liquid injection port (opening) 62 to the outside of the exterior container 31.

After gas is released, the battery 30 (temporary battery) is removed from the space 5 of the constraint jig 1. In the liquid injection port (opening) 62, the sealing plate 63 is welded to the exterior container 31. In this manner, the liquid injection port 62 (the opening of the storage hollow 41) is sealed (definitively sealed).

In an example, after gas is released to the outside of the exterior container 31 as described in the above, the liquid injection port 62 is sealed by, e.g., plugging it. In order to, for example, check the capacity of the battery 30, charging or discharging is performed as needed.

In another example, with the liquid injection port 62 being sealed with the sealing plate 63, adjustment of the state of charge by means of the aforementioned charging, etc., and aging in a high temperature atmosphere are performed. In such a case, after aging in a high temperature atmosphere, an opening is formed in the exterior container 31 at a different position from the liquid injection port 62. Through the formed opening, gas in the storage hollow 41 of the exterior container 31 (the inside of the exterior container 31) is released to the outside of the exterior container 31. After gas is released, a sealing plate, etc., that is similar to the sealing plate 63 is, for example, welded to the exterior container 31 at the opening. In this manner, the formed opening is sealed.

In the aforementioned embodiment, etc., after gas is generated in the storage hollow 41 by, e.g., aging in a high temperature atmosphere, a cooling fluid is caused to flow into the inner hollow 10 of each of the constraint plates 2. The battery 30 (temporary battery) is then cooled with a cooling fluid. In releasing of gas to the outside of the exterior container 31, cooling the battery 30 makes it difficult to flow out the electrolytic solution to the outside of the exterior container 31 through an opening such as the liquid injection port 62, through which gas is released. By making it difficult for the electrolytic solution to be ejected through the opening, the electrolytic solution is effectively prevented from adhering to the vicinity of the opening (the liquid injection port 62) in the exterior container 31. In this manner, in an opening such as the liquid injection port 62 through which gas has been released, the sealing plate 63, etc., is, for example, appropriately welded to the exterior container 31, and then the opening through which gas has been released is appropriately sealed (definitively sealed).

In the embodiments, etc., the constraint plates 2 and the battery 30 (including the exterior container 31 and the electrode group 32) are cooled to a temperature lower than room temperature (normal temperature). In an example, the constraint plates 2 and the battery 30 are cooled with cooling fluid to a temperature of 20° C. or lower. This makes it even more difficult, in releasing of gas to the outside of the exterior container 31, to flow out the electrolytic solution to the outside of the exterior container 31 through an opening such as the liquid injection port 62, through which gas is released.

As the constraint jig 1, it is preferable to use the constraint jig 1 in which the inner hollows 10 of the plurality of constraint plates 2 communicate with each other through the relaying passages 13. In such a case, a cooling fluid is supplied to a single flow passage in which the inner hollows 10 of the plurality of constraint plates 2 communicate with each other through the relaying passages 13. This suppresses variation in temperature of the cooling fluid supplied to the inner hollow 10 between the constraint plates 2. This prevents variation in temperature between the constraint plates 2 in the aforementioned cooling with a cooling fluid, thereby preventing variation in temperature between the batteries 30 arranged in the spaces 5. That is, in the aforementioned cooling with a cooling fluid, the entire constraint jig 1 is cooled to a uniform or substantially uniform temperature, and the plurality of batteries 30 are cooled to a temperature that is uniform or substantially uniform between the batteries 30. This effectively prevents the electrolytic solution from flowing out to the outside of the exterior container 31 in each of the batteries 30 arranged in the spaces 5 of the constraint jig 1.

Furthermore, in each of the spaces 5 of the constraint jig 1, the battery 30 (temporary battery) is arranged in such a manner that the electrode terminals 51A and 51B protrude from each of the constraint plates 2 toward the outer side of the constraint jig 1. This effectively prevents the electrode terminals 51A and 51B of the battery 30 from coming into contact with the constraint plates 2 in the aforementioned adjustment of the state of charge by the charging, etc., and aging in a high temperature atmosphere. By preventing the electrode terminals 51A and 51B from coming into contact with the constraint plates 2, the plurality of batteries 30 are effectively prevented from mutually conducting through the constraint plates 2, etc.

According to at least one of the embodiments or examples, each of the constraint plates of the constraint jig has an inner hollow and includes an inflow port that allows a cooling fluid to flow into the inner hollow and an outflow port that allows the cooling fluid to flow out of the inner hollow. Accordingly, it is possible to provide a constraint jig, which effectively prevents an outflow of an electrolytic solution to an outside of an exterior container when gas is released from an inside of the exterior container after charging and aging in manufacture of a battery.

According to at least one of the embodiments or examples, after the temporary battery is held in a higher than room temperature atmosphere, the temporary battery is cooled by causing a cooling fluid to flow into the inner hollow of each of the constraint plates. After cooling with the cooling fluid, the opening is formed in the exterior container, and gas inside the exterior container is released through the opening to the outside of the exterior container. Accordingly, it is possible to provide a manufacturing method of a battery which effectively suppresses an outflow of an electrolytic solution to an outside of an exterior container when gas is released from an inside of the exterior container after charging and aging in manufacturing of a battery.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing method of a battery, comprising:
    storing an electrode group in an exterior container, and injecting an electrolytic solution into the exterior container through a liquid injection port of the exterior container;
    in the exterior container in which the electrode group and the electrolytic solution are stored, forming a temporary battery by sealing the liquid injection port;
    arranging, in a constraint jig in which a plurality of constraint plates made of metal are arrayed, the temporary battery in a space between constraint plates that are adjacent to each other, and constraining the exterior container of the temporary battery with the plurality of constraint plates;
    in a state in which the exterior container is constrained with the plurality of constraint plates, causing the temporary battery to enter a charged state, and holding the temporary battery in a higher temperature than room temperature atmosphere;
    after the temporary battery is held in the higher temperature than room temperature atmosphere, cooling the temporary battery by supplying a cooling fluid to a single flow passage in which inner hollows of the plurality of constraint plates communicate with each other, the cooling fluid being supplied from one constraint plate to another constraint plate via the single flow passage;
    after cooling with the cooling fluid, forming an opening in the exterior container, and releasing gas inside the exterior container through the opening to an outside of the exterior container; and
    after releasing the gas, sealing the opening.

2. The manufacturing method according to claim 1, wherein cooling with the cooling fluid includes cooling the temporary battery to a lower temperature than room temperature.

3. The manufacturing method according to claim 2, wherein cooling the temporary battery to the lower temperature than room temperature includes cooling the temporary battery to a temperature of 20° C. or lower.

4. The manufacturing method according to claim 1, further comprising attaching an electrode terminal to an outer surface of the exterior container before injecting the electrolytic solution, wherein:
- arranging the temporary battery in a space between the constraint plates that are adjacent to each other includes arranging the temporary battery in such a manner that the electrode terminal protrudes from each of the constraint plates toward an outer side of the constraint jig.

5. The manufacturing method according to claim 1, wherein:
- sealing the liquid injection port of the exterior container includes attaching a plug to the liquid injection port;
- forming the opening in the exterior container includes forming the liquid injection port as the opening by detaching the plug attached to the liquid injection port; and
- sealing the opening includes welding a sealing plate to the exterior container at the liquid injection port.

* * * * *